(12) United States Patent
Braun et al.

(10) Patent No.: US 9,511,660 B2
(45) Date of Patent: Dec. 6, 2016

(54) ELECTRIC VEHICLE AXLE MECHANISM (71) Applicant: Robert Bosch GmbH, Stuttgart (DE)

(72) Inventors: Martin Braun, Neustetten-Wolfenhausen (DE); Thomas Winter, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/219,234

(22) Filed: Mar. 19, 2014

(65) Prior Publication Data

US 2014/0288739 A1    Sep. 25, 2014

(30) Foreign Application Priority Data

Mar. 19, 2013  (DE) .................. 10 2013 204 784

(51) Int. Cl.
*B60K 7/00* (2006.01)
*B60R 16/023* (2006.01)
(Continued)

(52) U.S. Cl.
CPC ............. *B60K 7/0007* (2013.01); *B60K 11/02* (2013.01); *B60L 1/003* (2013.01); *B60L 3/0046* (2013.01); *B60L 11/14* (2013.01); *B60L 11/1803* (2013.01); *B60L 11/1877* (2013.01); *B60L 15/20* (2013.01); *B60R 16/0232* (2013.01); *B60K 2001/003* (2013.01); *B60K 2001/006* (2013.01); *B60L 2240/12* (2013.01); *B60L 2240/36* (2013.01); *B60L 2240/421* (2013.01); *B60L 2240/423* (2013.01); *B60L 2260/28* (2013.01); *B60Y 2306/03* (2013.01); *Y02T 10/645* (2013.01);
(Continued)

(58) Field of Classification Search
CPC .... B60K 7/00; Y02T 10/7005; Y02T 10/7011; Y02T 10/641; Y02T 10/7016; B60R 16/0232
See application file for complete search history.

(56) References Cited

U.S. PATENT DOCUMENTS 5,014,800 A *  5/1991  Kawamoto .......... B60K 7/0007
                                                180/65.51
5,127,485 A *  7/1992  Wakuta ................ B60K 7/0007
                                                180/65.51
(Continued)

FOREIGN PATENT DOCUMENTS

DE      102011080038       1/2013

*Primary Examiner* — J. Allen Shriver, II
*Assistant Examiner* — Brian Cassidy
(74) *Attorney, Agent, or Firm* — Michael Best & Friedrich LLP (57) ABSTRACT

An electric vehicle axle mechanism comprising: at least one vehicle axle; a gear mechanism connected to the vehicle axle; an electric motor that comprises a rotor and that is connected to the gear mechanism for transmitting a torque to the at least one vehicle axle; a position sensing device for ascertaining a rotor position of the rotor; an electronic power unit that is connected to the electric motor for supplying electrical energy to the electric motor, wherein the electronic power unit furthermore comprises an evaluating device for evaluating the signals of the position sensing device and is connected to an evaluating device that is embodied as a separate device, wherein the position sensing device is integrated at least in part in the electronic power unit or the evaluating unit.

20 Claims, 2 Drawing Sheets (51) Int. Cl.
  *B60L 1/00* (2006.01)
  *B60L 3/00* (2006.01)
  *B60L 11/14* (2006.01)
  *B60L 11/18* (2006.01)
  *B60L 15/20* (2006.01)
  *B60K 11/02* (2006.01)
  *B60K 1/00* (2006.01)

(52) U.S. Cl.
  CPC .............. *Y02T 10/70* (2013.01); *Y02T 10/7005* (2013.01); *Y02T 10/705* (2013.01); *Y02T 10/7077* (2013.01); *Y02T 10/72* (2013.01); *Y02T 10/7275* (2013.01)

(56) References Cited

U.S. PATENT DOCUMENTS

| | | | | |
|---|---|---|---|---|
| 5,156,579 | A * | 10/1992 | Wakuta | H02K 9/19 180/65.51 |
| 5,419,406 | A * | 5/1995 | Kawamoto | B60K 1/02 180/60 |
| 5,472,059 | A * | 12/1995 | Schlosser | B60K 7/0007 180/65.51 |
| 5,633,544 | A * | 5/1997 | Toida | B60K 7/0007 180/65.1 |
| 5,691,584 | A * | 11/1997 | Toida | B60K 7/0007 180/65.51 |
| 7,061,150 | B2 * | 6/2006 | Sesselmann | H02K 5/225 310/68 R |
| 7,082,018 | B2 * | 7/2006 | Honda | B60L 7/22 361/18 |
| 7,118,119 | B2 * | 10/2006 | Amanuma | B60G 3/20 180/65.51 |
| 7,237,638 | B2 * | 7/2007 | Ishikawa | F16H 9/18 180/219 |
| 7,350,605 | B2 * | 4/2008 | Mizutani | B60K 7/0007 180/65.1 |
| 7,445,067 | B2 * | 11/2008 | Marsh | B60G 3/00 180/65.51 |
| 7,641,010 | B2 * | 1/2010 | Mizutani | B60K 7/0007 180/65.1 |
| 7,926,608 | B2 * | 4/2011 | Horii | B62K 5/027 180/210 |
| 8,316,973 | B2 * | 11/2012 | Walter | B60K 7/0007 180/65.51 |
| 8,448,541 | B2 * | 5/2013 | Kasuya | B60K 6/387 180/65.245 |
| 8,540,041 | B2 * | 9/2013 | Su | B60K 17/046 180/65.51 |
| 8,581,457 | B2 * | 11/2013 | Takahashi | B60K 7/0007 180/65.51 |
| 8,596,395 | B2 * | 12/2013 | Hirano | B60K 7/0007 180/65.51 |
| 8,602,145 | B2 * | 12/2013 | Su | B60K 7/0007 180/65.51 |
| 8,863,874 | B2 * | 10/2014 | Lee | B60K 7/0007 180/65.51 |
| 2004/0100155 | A1 * | 5/2004 | Sesselmann | F16H 49/001 310/75 R |
| 2004/0222638 | A1 * | 11/2004 | Bednyak | B63J 3/04 290/1 R |
| 2005/0211490 | A1 | 9/2005 | Shimizu et al. | |
| 2008/0035399 | A1 * | 2/2008 | Murata | B60K 7/0007 180/65.51 |
| 2009/0100965 | A1 * | 4/2009 | Sanji | B60K 6/26 74/606 R |
| 2011/0139522 | A1 * | 6/2011 | Takenaka | B60K 1/02 180/65.1 |
| 2012/0143426 | A1 * | 6/2012 | Yamamoto | B60K 6/448 701/22 |
| 2012/0330490 | A1 * | 12/2012 | Ozaki | G01D 5/2451 701/22 |
| 2013/0075183 | A1 * | 3/2013 | Kochidomari | B60K 7/0007 180/292 |
| 2013/0342056 | A1 * | 12/2013 | Suzuki | H02K 5/225 310/71 |
| 2013/0342059 | A1 * | 12/2013 | Suzuki | H02K 7/116 310/83 |
| 2014/0042876 | A1 * | 2/2014 | Brockerhoff | H02K 11/00 310/68 B |
| 2015/0005130 | A1 * | 1/2015 | Yamamoto | B60K 7/00 475/149 |
| 2015/0014085 | A1 * | 1/2015 | Kanna | B66F 9/07572 180/346 |
| 2015/0083505 | A1 * | 3/2015 | Pearce, Jr. | H02K 5/20 180/65.1 |
| 2015/0183312 | A1 * | 7/2015 | Senoo | B60K 7/0007 464/106 |
| 2016/0039276 | A1 * | 2/2016 | Takahashi | B60L 15/007 180/65.21 |

* cited by examiner

ELECTRIC VEHICLE AXLE MECHANISM

BACKGROUND OF THE INVENTION

The invention relates to an electric vehicle axle mechanism, and also to a vehicle, in particular a motor vehicle, having the electric vehicle axle mechanism.

It is generally known that the use of electric vehicles and hybrid vehicles will be accelerated owing to limited oil resources and the necessity to reduce $CO_2$ emissions in road transport. The drive unit of a vehicle of this type comprises an electric motor that is generally connected to the wheels by way of a gear mechanism. Furthermore, the drive unit comprises an electronic power unit or an inverter that provides the electric motor with energy. Moreover, the drive unit comprises an energy storage device that is generally embodied as a battery.

DE 10 2011 080 038 A1 discloses a drive unit for an electric vehicle and said drive unit comprises an electric motor that is arranged in a region of a face side of a vehicle axle of the electric vehicle. The electric motor comprises a drive axle that is provided on its open end with an entrainment toothed arrangement. A rotational speed sensor for ascertaining the rotational speed of the electric motor is arranged on the side of a drive axle of the electric motor, said side lying opposite the co-driving toothed arrangement. The casing of the electric motor is closed in an air-tight and fluid-tight manner on the side of the rotational speed sensor by means of a cover. In order to be able to discharge the heat of the electric motor in an effective manner as possible to the environment, circumferential cooling ribs are provided on the exterior surface of the casing in the region of a stator of the electric motor. Furthermore, a drive unit is provided that cooperates with the electric motor for the purpose of driving the respective wheel of the electric vehicle. The electric motor and the drive unit can be arranged close to the wheel.

SUMMARY OF THE INVENTION

The present invention provides an electric vehicle axle mechanism in which the cabling outlay is considerably reduced by virtue of the fact that the position sensing device is no longer embodied as a separate unit and is connected to the electronic power unit by way of a cable. In lieu thereof, the electric vehicle axle mechanism in accordance with the invention requires fewer connections and as a result requires fewer plug connectors, cables, sensor cables and fewer feedthroughs in the casing.

The fundamental idea of the present invention is, in the case of an electric vehicle axle mechanism of an electric vehicle, of a fuel cell vehicle or a hybrid vehicle, to integrate a position sensing device for ascertaining a rotor position of the rotor of the electromotor at least in part into an electronic power unit or into an evaluation device. As a consequence, it is possible to considerably reduce the amount of cabling that has hitherto been provided between the position sensing device and electric vehicle axles of this type, the reason for this being that the position sensing device is at least in part directly connected to the electronic power unit or to the electronic evaluating unit.

In one embodiment of the electric vehicle axle mechanism, the position sensing device comprises at least one position sensor for ascertaining the rotor position. The at least one position sensor is preferably fastened to a circuit board of the electronic power unit or to a circuit board of the evaluating device. This has the advantage that the position sensor does not require any additional cabling and moreover it renders possible a simpler assembly process. Furthermore, a robust design can be achieved since it is not necessary to fasten the position sensing device as a separate component, but rather said device is integrated into the electronic power unit or into the evaluating device. The element that is to be detected by means of the at least one position sensor is by way of example arranged on a rotating component of the electric motor or of the gear mechanism, wherein the rotating component is by way of example a shaft or a toothed wheel.

In one embodiment of the electric vehicle axle mechanism, the element that is to be detected is by way of example: a code disc, a disc that is marked in increments, a magnetic disc, a magnetic element and/or a toothed wheel flank of a toothed wheel of the gear mechanism. Owing to the fact that a toothed wheel flank of an existing toothed wheel is used as the element to be detected, it is possible to forego an element that is additionally provided for the purpose of being detected and as a consequence installation space and assembly costs can be further reduced.

The electric motor is connected without the use of cables to the electronic power unit in one embodiment of the electric vehicle axle mechanism. For this purpose, the electric motor and the electronic power unit are electrically connected to one another by way of example by means of at least one stamped grid that is in the form of a current conductor. In addition or as an alternative thereto, the coil wires or coil windings of the electric motor can also be connected to the electronic power unit. This has the advantage that the number of required components can be considerably reduced since the electric motor and the electronic power unit are not connected by cables as was hitherto the case. Accordingly the number of production steps can be reduced and as a result it is also possible to reduce the number of error sources during the assembly process and during operation. Furthermore, connections and transitions between materials are simplified and it is possible to provide a direct connection to a board or circuit board of the electric motor and/or of the electronic power unit.

The electronic power unit and the electric motor are arranged in one embodiment of the electric vehicle axle mechanism on the same side of the gear mechanism. It is preferred that the electronic power unit and the electric motor are arranged spatially as close to one another as possible. As a consequence, by way of example, the element that can be detected or the rotatably provided part of the position sensing device can be fastened directly to the shaft of the electric motor, and the evaluating device for the position sensing device can be integrated directly into the electronic power unit or can be arranged in the proximity of the electronic power unit. Likewise, the position sensing device can be connected in an identical manner by way of a user-defined shaft or a toothed wheel of the gear mechanism.

In a further embodiment, the electronic power unit and the electric motor are arranged on different sides of the gear mechanism. The electronic power unit can be arranged on a side of the gear mechanism, said side lying opposite the electric motor.

Alternatively, the electronic power unit can also be arranged on a side of the gear mechanism, said side being adjacent to the electric motor. As previously described, it is possible as a consequence to fasten the element that can be detected or the rotatably provided part of the position sensing device, for example directly to the shaft of the electric motor, and the evaluating device for the position sensing device can be integrated directly into the electronic power unit or arranged in the proximity of the electronic power unit. Likewise, the position sensing device can be connected in an identical manner by way of a user-defined shaft or a toothed wheel of the gear mechanism.

The evaluating device that is embodied as a separate device is arranged in one embodiment between the electric motor and the electronic power unit. As a consequence, it is possible to achieve a compact structure.

In one embodiment, the electronic power unit and/or the evaluating device are arranged in the longitudinal direction or in the transverse direction of the electric motor. The gear mechanism can be arranged by way of example parallel to the power electronic unit and the evaluating unit that are arranged in the transverse direction with respect to the electric motor. This has the advantage that a compact construction can be achieved. The same applies if the gear mechanism is arranged by way of example between the electric motor and the electronic power unit.

In embodiments, the electric motor, the gear mechanism, the electronic power unit and the evaluating device are arranged spatially as close to one another as possible, by way of example in a common casing. As a consequence, the number of connections can be reduced and the assembly process accordingly simplified. Moreover, it is possible to achieve a robust design.

The electric motor, the gear mechanism, the electronic power unit and the evaluating device can be cooled in one embodiment by means of a common cooling circuit and said components can also be additionally lubricated as required. As a consequence, the cooling arrangement is considerably simplified and production costs are reduced. Furthermore, it is possible to reduce the installation space in the vehicle.

An additional electronic device is integrated in a further embodiment into the electronic power unit or the evaluating device. The at least one electronic device is fastened by way of example to a circuit board of the electronic power unit or of the evaluating device. As a consequence, it is possible to reduce the number of additional connections and consequently to reduce the number of associated plug connectors, cables, etc.

The at least one additional electronic device is in one embodiment by way of example a power module, a driver component, a filter or an actuator. The actuator is by way of example:
  an actuator for a cooling medium pump for pumping cooling medium through the cooling circuit,
  an actuator for actuating at least one valve, for example a valve for controlling and/or regulating the through flow of cooling medium through the cooling circuit and/or to a nozzle,
  an actuator for actuating a blower, or
  a switching actuator.

However, the invention is not limited to the mentioned examples.

BRIEF DESCRIPTION OF THE DRAWINGS

Further features and advantages of the present invention are explained hereinunder with reference to the figures, in which.

DETAILED DESCRIPTION

Figure 1:
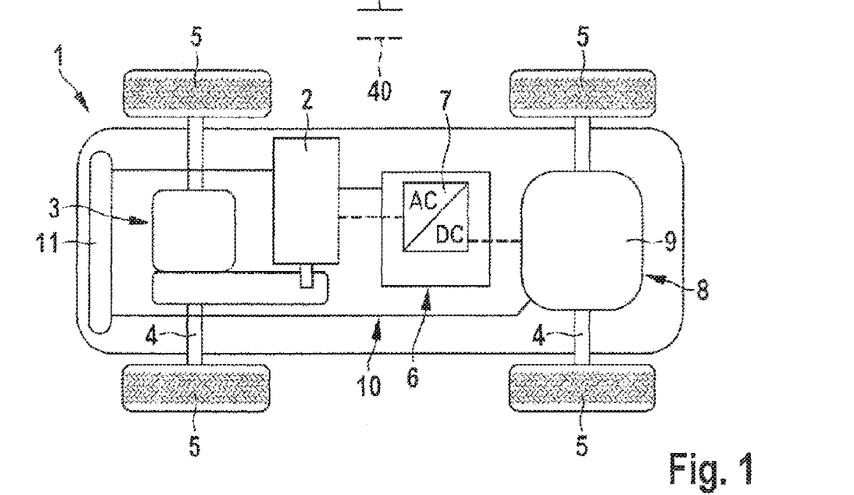
FIG. 1 illustrates a schematic view of a vehicle having a drive unit whose components are embodied as separate units.

FIG. 1 illustrates a schematic view of a vehicle 1 having a drive unit whose components are embodied as separate units having a thermal connection and an electrical connection. FIG. 1 illustrates a thermal connection 39 and an electrical connection 40 of the components.

As described earlier in the introduction to the description, the drive unit, for example of an electric vehicle or a hybrid vehicle, comprises an electric motor 2 that is connected in general by way of a gear mechanism 3 to a vehicle axle 4 and the wheels 5 thereof. Furthermore, the drive unit comprises an electronic power unit 6. The electronic power unit 6 comprises an inverter 7 that is electrically connected to the electric motor 2 for the purpose of supplying said electric motor with energy. Moreover, the drive unit comprises an energy storage device 8 that is generally embodied as a battery 9 and is electrically connected to the inverter 7 in order to convert a direct current of the battery 9 by means of the inverter 7 into an alternating current for the electric motor 2. The vehicle axle 4 of the vehicle 1 is driven by means of the electric motor 2 by way of the allocated gear mechanism 3 and torque is transmitted to the wheels 5 of the vehicle axle 4, as illustrated in FIG. 1.

The components are all embodied as separate units having both a thermal and also an electrical connection, as illustrated in FIG. 1. The lost energy in the electric motor 2 and in the electronic power unit 6 is generally discharged by way of a cooling circuit 10. This cooling circuit 10 discharges the lost energy either from each component separately or the components are thermally connected in series for this purpose, as illustrated in FIG. 1. In part, the two arrangements are also combined.

It is possible with the aid of a vehicle cooler 11 to re-cool the cooling circuit 10 that is required for this purpose. The gear mechanism 3 is typically cooled in a passive manner by way of the gear mechanism casing. The lost energy that is to be discharged is relatively small since the gear mechanism 3 has a very high degree of efficiency.

The battery 9 in the form of an energy storage device is either air-cooled, as illustrated in FIG. 1, or cooled by way of a separate water circuit that is simultaneously cooled by way of a cold circuit of an air conditioning system of the vehicle 1.

Figure 2:
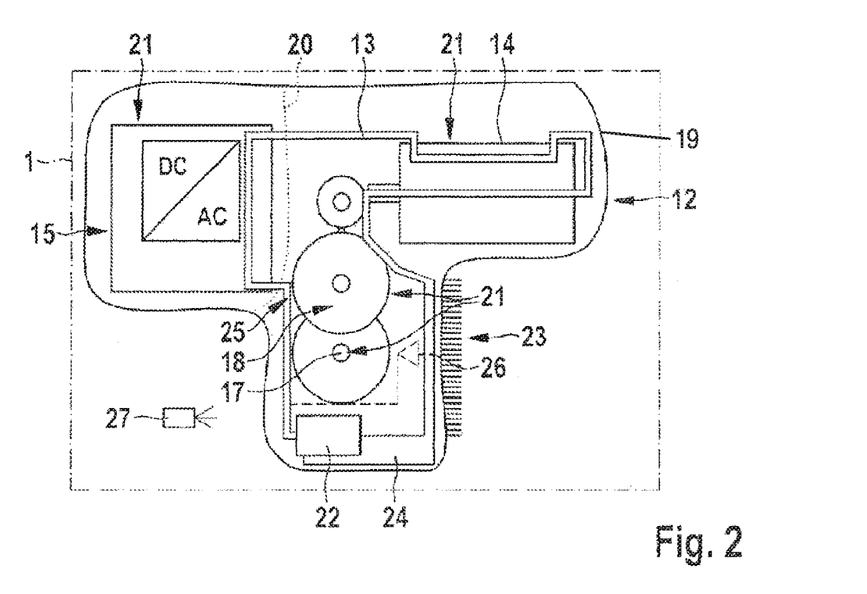
FIG. 2 illustrates a schematic view of an electric vehicle axle mechanism in accordance with one embodiment of the invention.

FIG. 2 illustrates a schematic view of an integrated electric vehicle axle mechanism 12 in accordance with one embodiment of the invention.

In the case of an embodiment of the invention illustrated in FIG. 2, the components 21 of the electric vehicle axle mechanism 12 are cooled in a common cooling circuit 13 by a cooling medium. By way of example, oil such as for example transmission oil, is used as the cooling medium. Transmission oil is used in hitherto existing electric vehicles and hybrid vehicles for cooling and lubricating gear mechanism elements of a gear mechanism. As a consequence, it is now possible to achieve a thermally independent unit without having to connect to a thermal system of the vehicle.

As illustrated in the exemplary embodiment in FIG. 2, the highly integrated electric vehicle axle mechanism 12 comprises as components 21 a motor, in this case an electric motor 14, which has an associated electronic power unit 15. The electronic power unit 15 comprises at least one current converter or inverter 16 for providing a suitable current, for example alternating current, for the electric motor 14.

Figure 3:
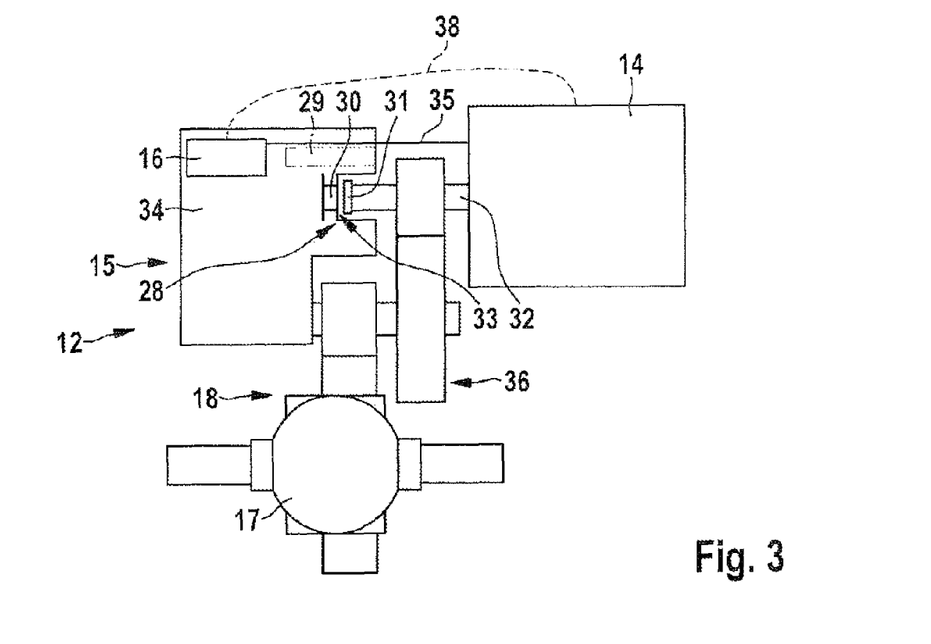
FIG. 3 illustrates a schematic view of the arrangement of an electronic power unit and an electric motor of an exemplary embodiment of the electric vehicle axle mechanism in accordance with the invention.
Figure 4:
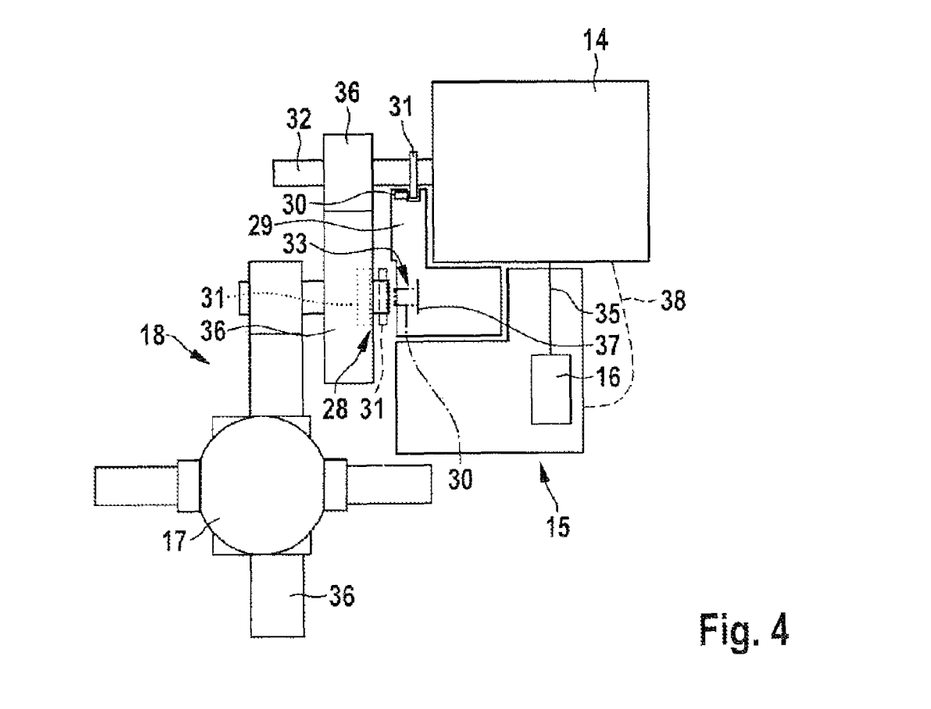
FIG. 4 illustrates a schematic view of the arrangement of an electronic power unit and an electric motor of a further exemplary embodiment of an electric vehicle axle mechanism in accordance with the invention.

As is explained by way of example hereinunder with reference to FIGS. 3 and 4, the electronic power unit 15 can moreover comprise, in addition to the inverter 16, by way of example:

- at least one part of a position sensing device for ascertaining a rotor position of a rotor of the electric motor 14,
- an evaluating device for evaluating signals from the position sensing device, and/or
- at least one further electronic device, such as for example an actuator, a power module, a filter, a drive component, etc.

The actuator can be by way of example:
- an actuator for actuating an oil pump 22,
- an actuator for actuating at least one valve, by way of example a valve (not illustrated) for controlling and/or regulating the through flow of the cooling medium through the cooling circuit 13,
- a switching actuator, or
- an actuator for actuating a blower 27.

The electric vehicle axle mechanism 12 comprises as additional components 21 at least one axle or rather vehicle axle 17 and at least one gear mechanism 18 for the purpose of transmitting a torque to the axle 17 and to the vehicle wheels that are connected to the axle. The gear mechanism 18 in embodiments of the invention can comprise by way of example a differential for the purpose of transmitting torque.

The electric vehicle axle mechanism 12 can be embodied as a front axle drive, rear axle drive or all-wheel drive. The electric vehicle axle mechanism 12 can comprise a front axle or a rear axle of the vehicle 1 for the purpose of embodying the front axle drive or the rear axle drive respectively of the vehicle 1. In order to embody an all-wheel drive, it is possible to combine two electric vehicle axle mechanisms 12 with one another, wherein one electric vehicle axle mechanism 12 comprises the front axle and the other electric vehicle axle mechanism 12 comprises the rear axle. Likewise, it is also possible to provide only one electric vehicle axle mechanism 12 in order to embody an all-wheel drive and said electric vehicle axle mechanism comprises an axle 17 of the vehicle, by way of example the front axle, and said electric vehicle axle mechanism simultaneously drives the other vehicle axle or rather the rear axle by way of a final drive (not illustrated). The wheels of the vehicle can be fastened to the respective vehicle axle 17 of the electric vehicle axle device 12.

The high level of integration of the electric vehicle axle mechanism 12 is achieved by virtue of the fact that at least two or all components of the electric vehicle axle mechanism 12 are arranged spatially as close to one another as possible. The components of the electric vehicle axle mechanism 12 are arranged by way of example in a common casing 19, as illustrated in FIG. 2. Furthermore, the casing 19 can comprise in one embodiment optionally one or multiple additional partitions 20, as illustrated in FIG. 2 by a dotted line, for the purpose of at least in part shielding a component 21 inside the casing 19 in order to prevent by way of example the component 21 becoming contaminated. In the event that the electronic power unit 15 comprises additional electronic devices in addition to the inverter 16, the inverter 16 and the additional electronic devices can be arranged in a common region in the casing 19 or they can be arranged at different sites in the casing 19 depending upon their function and their intended purpose. The inverter 16 and the additional electronic devices can be at least in part shielded from the other components 21 and/or from one another by means of one or multiple partitions 20.

As is illustrated in the exemplary embodiment in FIG. 2, the motor, in this case the electric motor 14, is connected to the gear mechanism 18 for the purpose of transmitting a torque to the axle 17 that is connected to the gear mechanism 18 or axles, and to the vehicle wheels that are connected to the axle 17 or rather axles. The motor 14 is supplied with electrical energy by way of the inverter 16 illustrated in FIG. 2. The inverter 16 can in turn be connected to an energy storage device, wherein the energy storage device is by way of example a battery. The energy storage device supplies the inverter 16 with direct current that is converted into alternating current by means of the inverter 16 and said alternating current is supplied to the electric motor 14.

The energy storage device (not illustrated) is arranged in the exemplary embodiment illustrated in FIG. 2 in the vehicle 1 outside the casing 19 of the electric vehicle axle mechanism 12. The inverter 16 of the electric vehicle axle mechanism 12 can be electrically connected to the energy storage device, as previously described, for the purpose of supplying electrical energy from the energy storage device to the electric motor 14 by way of the inverter 16.

As is illustrated in FIG. 2, a closed cooling medium circuit 13 in particular a closed oil cooling circuit is provided inside the integrated electric vehicle axle mechanism 12. The oil is guided as the cooling medium with the aid of the oil pump 22 either sequentially and/or in parallel through the components 21 of the electric vehicle axle mechanism 12 that are to be cooled. As a consequence, it is possible to ensure that all the components 21 are warmed or cooled.

The oil is re-cooled, as illustrated in the exemplary embodiment in FIG. 2, by way of example in a passive manner by way of the casing 19. In the case of the passive re-cooling of the oil, the oil is cooled by means of coming into contact with the casing 19.

At least one region of the exterior surface of the casing 19, as illustrated in FIG. 2, is provided optionally with at least one or multiple additional cooling ribs 23 in order to further improve the heat transfer to the ambient air.

This passive cooling renders it possible for at least one part or preferably the entire lost energy that occurs in the electric vehicle axle mechanism 12 to be discharged to the ambient air by way of the casing 19.

As illustrated in FIG. 2, the vehicle axle mechanism 12 comprises as an oil pump 22 a dedicated oil pump or an oil pump that is not dependent on the rotational speed, said oil pump being connected to an oil sump 24 or the purpose of pumping oil to the components 21 of the vehicle axle mechanism 12 in order to cool and/or lubricate said vehicle axle mechanism. The oil pump 22 and the oil sump 24 are provided by way of example in the casing 19 of the electric vehicle axle mechanism 12, as illustrated in FIG. 2. The oil pump has the advantage that it is not dependent upon the rotational speed of the electric motor since said oil pump is not driven by way of the electric motor 14. This oil pump can therefore pump oil to the components 21 of the electric vehicle axle device 12 if the rotational speed of the electric motor 14 is still zero.

Likewise, the oil pump 22 and/or the oil sump 24 can also be provided outside the casing 19 in the vehicle (not illustrated) and can be connected to an oil line system (not illustrated) of the electric vehicle axle mechanism 12 for the purpose of pumping oil to the components 21 of the electric vehicle axle mechanism 12.

All the components 21 are purposefully cooled by means of the oil pump 22 in that the oil pump 22 pumps oil through the components 21 in a parallel and/or sequential manner. Moreover, it is not only possible to cool components 21 of the electric vehicle axle device 12 by means of oil but rather said components can also be lubricated in this manner, such as by way of example the gear mechanism 18. The oil pump 22 can be driven in a mechanical and/or electrical manner. In the case of an electrically driven oil pump or rather in the case of the mechanically and electrically driven oil pump, it is possible to ensure that all the components 21 are lubricated and cooled irrespective of a fraction machine rotational speed. The mechanically and electrically driven oil pump can be driven by way of a dedicated device, such as by way of example a freewheel (not illustrated) by means of a traction machine (not illustrated) and/or by way of a dedicated electric pump motor (not illustrated).

Oil is conveyed for the purpose of cooling and/or lubricating the individual components 21 of the vehicle axle mechanism 12 by way of the oil line system 25 having its oil lines. The oil line system 25 can be integrated with its oil lines in part or completely in the casing 19 or said oil line system can be embodied in one piece. In addition or as an alternative thereto, at least one part of the oil lines of the oil line system 25 can also be arranged as separate lines in the casing 19.

By way of example, in order to cool these components 21, oil is conveyed by way of the oil line system 25 first to the electronic power unit 15 and its inverter 16 and subsequently to the electric motor 14, or in reverse. Subsequently, the gear mechanism 18 is supplied with oil by way of the oil line system 25 in order to cool and/or to lubricate the gear mechanism 18. In the case of the gear mechanism 18, it is possible to lubricate and/or cool by way of example gear mechanism elements, such as at least one coupling, a bearing and/or a toothed wheel, etc. by means of the oil.

Oil can flow through the components 21 of the vehicle axle device 12 in a sequential manner, as illustrated in FIG. 2, and/or in a parallel manner. In the exemplary embodiment illustrated in FIG. 2, an oil line system 25 is illustrated by way of which oil is conveyed sequentially by means of the oil pump 22 from the oil sump 24 of the casing 19 for the purpose of cooling and if necessary additionally lubricating the components 21 of the vehicle axle device 12. The sequence commences, as illustrated in FIG. 2, by way of example with the electronic power supply 15 and its inverter 16 and then continues to the electric motor 14 and finally from the electric motor 14 to the gear mechanism 18. The sequence in FIG. 2 is merely an example and the invention is not limited thereto.

As illustrated in FIG. 2, in the case of an example for a dedicated arrangement of a sequential through flow of oil as the cooling medium, first the electronic power unit 15 and its inverter 16 are cooled by the oil, since the greatest demands are for the electronic power unit 15 and its inverter 16 to be cooled. As a consequence, the electronic power supply 15 and its inverter 16 are cooled with as cool as possible oil. It is preferred that the oil flows from the electronic power unit 15 and its inverter 16 to the motor, in this case the electric motor 14. A stator and/or a rotor of the electric motor 14 can be cooled by the oil. Once the oil flow has cooled the electric motor 14, the oil flow is preferably conveyed to the gear mechanism 18 and to at least one or multiple gear mechanism elements, such as by way of example at least one toothed wheel, a bearing and/or a coupling. The toothed wheels, bearings and couplings can be both cooled and also lubricated. The arrangement of the gear mechanism 18 and its gear mechanism elements, such as bearings, toothed wheels, couplings, etc. at the end of the cooling chain has in addition the advantage that as the electric vehicle axle device 12 is started and during its warm up the degree of efficiency of these gear mechanism elements is significantly improved since the oil can achieve a significantly higher temperature level as a result of the lost energy of the electric components being absorbed and as a consequence the viscosity of the oil is less, which results in smaller losses in the case of the gear mechanism elements, such as for example bearings, toothed wheels, couplings, etc.

One or multiple couplings (not illustrated) can be provided as gear mechanism elements in order to provide a two-gear gear mechanism or a multi-gear gear mechanism in the vehicle 1.

Whilst cooling the electric motor 14, it is also possible in addition to cooling the stator to also cool the rotor and the winding poles of the electric motor 14 in a purposeful manner by means of the oil. Moreover, the respective winding pole of the electric motor 14 can additionally be sprayed with oil as a cooling medium by way of at least one additional nozzle (not illustrated) in the casing 19. The nozzle is by way of example connected to the oil line system 25 and the oil pump 22 or is by way of example supplied with oil from the oil sump 24 in the casing 19 by way of a dedicated oil line system and/or a dedicated oil pump. The rotor that comprises by way of example a hollow shaft can in turn be cooled by oil flowing through the hollow shaft, said oil being for example from the oil sump 24 in the casing 19.

Furthermore, it is possible, as previously described, to use the casing 19 for re-cooling the transmission oil. It is possible to spray the casing 19 by way of example additionally from inside by way of one or multiple cooling medium nozzles 26 with the oil that has previously been used for cooling and if necessary lubricating the components 21 of the vehicle axle device 12, as indicated in FIG. 2. As a consequence, the surface of the casing 19 can be used in an active manner for cooling purposes. The cooling medium nozzle 26 is by way of example connected to the oil line system 25 and the oil pump 22, as indicated in FIG. 2 by a broken line. Likewise, it is also possible to connect the cooling medium nozzle 26 to a dedicated oil pump and/or a dedicated oil sump by way of a dedicated oil line system (not illustrated).

In addition or as an alternative to providing at least one nozzle and/or one cooling medium nozzle 26, it is possible for the purpose of enhancing the cooling effect to provide the casing outer wall at least in one section with the one or the multiple cooling ribs 23, as previously described. The heat is discharged by means of convection to the ambient air.

In addition or as an alternative to the at least one nozzle, to the at least one cooling medium nozzle 26 and/or to the at least one cooling rib 23, it is possible to enhance the cooling effect by means of at least one additional blower 27. The at least one blower 27 is provided outside the casing 19 of the electric vehicle axle device 12 in the vehicle 1 and blows air from the outside onto the casing 19 in order to additionally cool the casing 19.

The transmission oil that has been hitherto used in the vehicle 1 only for the gear mechanism 18 can be additionally used in this manner as a cooling medium for additional or preferably all the components 21 of the electric vehicle axle mechanism 12.

The casing 19 can be used as a re-cooler by virtue of arranging the components 21 or at least parts of the components 21 of the electric vehicle axle mechanism 12 spatially as close to one another as possible, preferably in a common casing 19. The casing 19 can be used for different functions, such as for cooling the rotor of the electric motor 14. For this purpose, an oil pump 22 can be used for recirculating the transmission oil and by way of example in addition for cooling the winding of the electric motor in the casing 19.

It is possible to have at least one fewer cooling circuit in the vehicle 1, as a consequence of which the number of required connections and also the number of individual components required for the cooling circuit can be considerably reduced. An efficient and purposeful high integration of the electric vehicle axle mechanism 12 is rendered possible as a result of arranging the components 21 of the electric vehicle axle mechanism 12 spatially as close to one another as possible and as a result of cooling the components 21 by means of the transmission oil. Moreover, by virtue of cooling the components 21 of the electric vehicle axle mechanism 12 by means of the transmission oil, a thermally independent unit is produced for an electric drive unit in hybrid vehicles, fuel cell vehicles and electric vehicles, it being possible to operate said thermally independent unit without having to connect to the thermal system of the vehicle 1.

As a consequence, the electric vehicles can have at least one less cooling circuit than was hitherto required. In the case of hybrid vehicles, it is possible in turn to forego the costly thermal connection of the electric axle to the cooling circuit of the combustion engine. Moreover, in the case of electric vehicles and hybrid vehicles, the number of required connections and also the number of individual components required for the cooling circuit are considerably reduced.

The highly integrated electric vehicle axle mechanism 12 provides a novel thermal management system. It is possible to cool thermally independent components of the vehicle axle mechanism 12 by way of example in a passive manner by means of the airflow, in particular to cool the casing 19 in which the components 21 are arranged spatially as close to one another. The cooling effect can be further enhanced by means of the at least one blower 27, for example a standard blower that is arranged outside the casing 19 and cools said casing. Furthermore, the viscosity of the oil can be improved and used to an optimum effect by means of suitably conveying the oil along the components 21 of the vehicle axle mechanism 12 wherein by way of example the gear mechanism 18 can be cooled and lubricated at the end by means of the oil that has in the meantime been warmed or further warmed.

The advantage of the described electric vehicle axle mechanism 12 resides in the fact that intrinsically safe components can be provided. Furthermore, the electric vehicle axle mechanism 12 can be integrated more easily into an existing system as by way of example transmission oil that would have been hitherto used only for cooling and lubricating the gear mechanism can be used. As a consequence, costs and weight can be reduced.

Furthermore, it is possible to pre-heat the gear mechanism 18 by means of a more rapid warming of said gear mechanism and consequently an advantage is achieved in relation to the degree of efficiency. Moreover, the reliability is increased as a result of the reduced number of connections and components and it is possible to reduce the installation space in the vehicle. It is possible to suitably adapt the sequence of the components 21 that are to be cooled and if necessary lubricated so that it is possible to improve the degree of efficiency and consequently to reduce the cooling capacity required.

On the vehicle side, the use of the electric vehicle axle mechanism 12 in the case of electric vehicles renders it possible to forego the vehicle cooler and consequently also to forego the cooling medium for cooling the vehicle axle mechanism. Furthermore, it is possible to forego a circulating pump for the cooling medium of the vehicle cooler and to forego water regulating valves. Moreover, it is possible to forego cooling lines for the cooling medium of the vehicle cooler and to forego the connections hitherto required for said cooling lines. Furthermore, it is not necessary in the case of electric vehicles and hybrid vehicles to perform a process of filling or only part filling the cooling circuit during the production of the vehicle.

In the case of the electric vehicle axle mechanism 12 in accordance with the invention, the rotor position of the electric motor 14 is ascertained by way of a position sensing device. A position sensor in the position sensing device is by way of example a rotary position sensor, an incremental position sensor or an absolute value position sensor, etc., wherein however the invention is not limited to the mentioned examples for position sensors.

An efficient and compact arrangement of the electronic power unit 15, of the electric motor 14, of the gear mechanism 18 and of the vehicle axle 17 is illustrated in the exemplary embodiments hereinunder of the electric vehicle axle mechanism 12 in accordance with the invention in FIGS. 3 and 4. In this case, the amount of cabling together with the required plug connections or solder connections can be considerably reduced.

As previously explained with regard to FIG. 2, the electronic power unit 15 comprises at least the inverter 16. Furthermore, the electronic power unit 15 can by way of example comprise at least:

- a part of a position sensing device 28 for ascertaining a rotor position of a rotor of the electric motor 14,
- an evaluating device 29 for evaluating the signals of the position sensing deice 28, and/or
- at least one additional electronic device, such as for example an actuator, a power module, a filter, a driver component, etc. depending upon the function and the intended purpose, as explained in an exemplary manner hereinunder with reference to FIGS. 3 and 4.

FIG. 3 illustrates a schematic view of an embodiment of the arrangement of the electronic power unit 15, of the electric motor 14, of the gear mechanism 18 and of the vehicle axle 17 of the electric vehicle axle mechanism 12. The electronic power unit 15 is arranged together with the inverter 16 in the longitudinal direction of the electric motor 14. Moreover, the gear mechanism 18 is provided by way of example parallel to the electronic power unit 15 and the electric motor 14. Moreover, in addition, at least one part of the position sensing device 28 or the entire position sensing device 28 is arranged in the longitudinal direction of the electric motor 14, as illustrated in FIG. 3.

Furthermore, the electronic power unit 15 can be provided on one side of the gear mechanism 18 and the electric motor 14 can be provided on the other side of the gear mechanism 18, as illustrated in FIG. 3. Fundamentally, the electronic power unit 15 and the electric motor 14 can also be arranged on one side of the gear mechanism 18 (not illustrated), for example in the longitudinal direction of the electric motor 14, or can be arranged on two opposite lying sides of the gear mechanism 18 (not illustrated).

The signals of the position sensing device 28 for ascertaining the rotor position of the electric motor 14 are evaluated by way of the evaluating device 29. The position sensing device 28 comprises as a rotor position sensor or a position sensor 30 by way of example a rotary position sensor or a different suitable sensor or a combination of sensors for directly and/or indirectly ascertaining the rotor position of the electric motor 14. The signals of the position sensing device 28 are evaluated by means of the evaluating device 29, such as for example a micro controller.

In the case of the arrangement illustrated in FIG. 3, the electronic power unit 15 together with its inverter 16, the position sensing device 28 and the evaluating device 29 are arranged on one side of the gear mechanism 18, whereas the electric motor 14 is arranged on another side of the gear mechanism 18, by way of example on the opposite lying side. The sequence of electronic power unit 15, gear mechanism 18 and electric motor 14 is illustrated in FIG. 3 in a purely schematic and greatly simplified manner. This also applies to the following FIG. 4.

For the purpose of ascertaining the position of the rotor of the electric motor 14, at least a first part 31 of the position sensing device 28, said first part being in particular a part that is provided in a moving and rotating manner and is to be detected, is arranged directly on a shaft 32 of the electric motor 14, in this case the motor shaft, in order to move or to rotate with said motor shaft, as illustrated in FIG. 3. The first part 31 of the position sensing device 28 is by way of example a code disc, a disc that is marked in increments, a magnetic disc, a magnetic element, etc. It is also possible to provide the first part 31 of the position sensing device 28 on a toothed wheel in lieu of on a shaft of the electric motor 14 or on each other shaft of the gear mechanism 18. In lieu of the aforementioned code discs, discs that are marked in increments, magnetic elements, etc., it is also possible to use by way of example a toothed wheel flank of a toothed wheel as a first part or as a part to be detected 31 of the position sensing device 28.

A second part 33 of the position sensing device 28, in particular a part of the position sensing device 28 that is stationary or fixed with respect to the first part 31, is provided by way of example on a board or a circuit board 34 of the electronic power unit 15. The second part 33 of the position sensing device 28 is by way of example the position sensor, such as for example a rotary position sensor. The rotary position sensor can in turn be by way of example an incremental position sensor, an absolute value position sensor, etc. The invention is not limited to the mentioned examples for the first and second part 31, 33 of the position sensing device 28.

As previously described, it is also possible to arrange at least the first part or the part that is to be detected 31 of the position sensing device 28 on any shaft 32 of the gear mechanism 18, as indicated in the following FIG. 4 by a broken line, or on a toothed wheel 36 of the gear mechanism 18, as indicated in the following FIG. 4 by a dotted line.

It is possible to integrate the evaluating device 29 for evaluating the signals of the position sensing device 28, such as for example a micro controller, into the electronic power unit 15, as illustrated in FIG. 3. Likewise, the evaluating device 29 can also be embodied as a separate part, as illustrated in the following FIG. 4, and can be provided by way of example as close as possible to the electronic power unit 15 and/or to the electric motor 14.

In the exemplary embodiment in FIG. 3, the electrical connection between the electric motor 14 and the inverter 16 of the electronic power unit 15 is achieved by way of example directly by way of at least one stamped grid 35. Alternatively, it is possible by way of example to connect the winding wires 38 of the electric motor 14 directly to the inverter 16 of the electronic power unit 15, as is indicated in FIG. 3 by a broken line. In both cases, it is possible to forego the cabling between the electric motor 14 and the inverter 16.

FIG. 4 illustrates a schematic view of a further embodiment of the arrangement of the electronic power unit 15, of the electric motor 14, of the gear mechanism 18 and of the vehicle axle 17 of the electric vehicle axle mechanism 12.

In the case of the embodiment illustrated in FIG. 4, the electronic power unit 15 together with its inverter 16, and the evaluating device 29, for example a micro controller, are arranged in the radial direction or transverse direction of the electric motor 14, rather than in the longitudinal direction as illustrated in FIG. 3. It is likewise possible to arrange at least one part or the entire position sensing device 28 in a radial manner with respect to the electric motor 14, as illustrated in FIG. 4.

As previously described with regard to FIG. 3, it is also possible in FIG. 4 for the purpose of ascertaining the position of the rotor of the electric motor 14 to arrange at least one first part 31 of the position sensing device 28, in particular a part of the position sensing device 28 that is provided in a moving or rotating manner, directly on a shaft 32 or on a toothed wheel 36 of the electric motor 14 or on the gear mechanism 18 that is connected to said electric motor in order to move or to rotate with the shaft 32 or rather the toothed wheel 36. It is possible to provide the allocated position sensor 30 in the evaluating device 29 on a board or a circuit board 37, as illustrated in FIG. 4.

The first part or the part to be detected 31 of the position sensing device 28 is by way of example a code disc, a disc that is marked in increments, a magnetic disc, a magnetic element, etc. Rather than the first part 31 being provided by way of example on the motor shaft of the electric motor 14, as illustrated in FIG. 4, or on a shaft of the gear mechanism 18, as indicated in FIG. 4 by a broken line, said first part can be provided on a toothed wheel 36 of the gear mechanism 18, as indicated in FIG. 4 by a dotted line, and said first part can be detected by means of a second part 33, such as a position sensor 30. By way of example, a toothed wheel flank of a toothed wheel 36 of the gear mechanism 18 can also be used as a first part 31 of the position sensing device 28 in lieu of the aforementioned code discs, discs that are marked in increments, magnetic elements etc.

The second part 33 of the position sensing device 28, in particular a part of the position sensing device 28 that is stationary or fixed with respect to the first part 31, is provided by way of example on a board or a circuit board of the electronic power unit 15 (not illustrated) or on a board or circuit board 37 of the evaluating device 29, as indicated in FIG. 4 by a dot-dashed line, for the purpose of detecting the allocated first part 31 of the position sensing device, said first part being illustrated by the dotted or broken line, in FIG. 4. The second part 33 of the position sensing device 28 is by way of example the position sensor 30, such as for example a rotary position sensor or another suitable sensor, etc.

In the exemplary embodiment in FIG. 4, the electrical connection between the electric motor 14 and the inverter 16 of the electronic power unit 15 is achieved, as previously in FIG. 3, likewise directly by way of at least one stamped grid 35. Alternatively, it is also possible by way of example to connect the winding wires 38 of the electric motor 14 directly to the inverter 16 of the electronic power unit 15, as previously in FIG. 3. It is possible in both cases to forego the cabling between the electric motor 14 and the inverter 16. Since the electronic power unit 15 is arranged directly on the electric motor 14 in the exemplary embodiment in FIG. 4 and the gear mechanism 18 is not positioned between the two, it is possible by way of example to provide a particularly short stamped grid 35 for the purpose of connecting the electric motor 14 to the electronic power unit 15. This also applies for connecting the winding wires 38 of the electric motor 14 to the electronic power unit 15 and its inverter 16. It is also possible in this case to shorten the connection since a gear mechanism 18 is not positioned between the electric motor 14 and the electronic power unit 15, which would have had to be bridged.

Rather than arranging the electric motor 14 and the electronic power unit 15 on two opposite lying sides of the gear mechanism 18, as illustrated in FIG. 3, or on the same side, as illustrated in FIG. 4, it is also possible to arrange said components for example on two adjacent lying sides of the gear mechanism 18 (not illustrated). The evaluating device 29 can be integrated in the electronic power unit 15, as illustrated in FIG. 3, or as a separate part, for example between the electric motor 14 and the electronic power unit 15, as illustrated in FIG. 4.

Since in the case of the embodiments illustrated in FIGS. 3 and 4, the electrical connection between the electric motor 14 and the electronic power unit 15 and its inverter 16 is achieved either directly by way of at least one stamped grid 35 and/or the winding wires 38 of the electric motor 14 are connected directly to the electronic power unit 15 and its inverter 16, it is possible to arrange the electronic power unit 15 and the electric motor 14 by way of example in a common casing, as previously illustrated by way of example in FIG. 2. The evaluating device 29 can be arranged as a part of the electronic power unit 15 or as a separate part likewise in the common casing, as previously illustrated by way of example in FIG. 2.

Furthermore, it is possible to reduce the number of connections required for plug connectors, cables, sensor cables, etc. and feedthroughs in the casing. As a consequence, it is moreover possible to simplify the assembly process and to provide a robust design. Furthermore, the weight can be reduced as can the production costs.

The electronic power unit 15 can comprise in addition to the inverter 16, the evaluating unit 29 and at least one part of the position sensing device 28, at least one additional electronic device, such as by way of example an actuator, a power module, a filter, and/or a driver component, etc.

The advantage resides in the fact that the electronic power unit 15 according to FIGS. 3 and 4 can be arranged in the installation variants illustrated in said figures inside the integrated electric vehicle axle mechanism 12. The position sensor 30 that is required for the purpose of ascertaining the rotor position can be integrated in the electronic power unit 15, in that said position sensor is fastened to a board or a circuit board 34 of the electronic power unit 15.

In the case of the two arrangements illustrated in FIGS. 3 and 4, it is possible to reduce the cabling costs and both the sensor connection and also the connection between the electric motor 14 and the electronic power unit 15 can be embodied in a particularly compact and cost-effective manner.

By virtue of providing a power connection between the electric motor 14 and the electronic power unit 15 by way of at least one stamped grid 35 or by way of winding wires 38 of the electric motor 14, it is possible to forego manufacturing steps, and error sources during the assembly process and during operation can be reduced. Likewise, the number of required components can be reduced. Moreover, connections and material transitions can be simplified.

Although the present invention has been thoroughly described with reference to the exemplary embodiments, said invention is not limited to said exemplary embodiments, but rather said invention can be modified in a varied manner. In particular, the exemplary embodiments that are previously described with reference to FIGS. 2 to 4 can also be combined with one another, in particular the individual features of said exemplary embodiments.

What is claimed is:

1. An electric vehicle axle mechanism (12) comprising:
   at least one vehicle axle (17),
   a gear mechanism (18) that is connected to the vehicle axle (17),
   an electric motor (14) that comprises a rotor and an output shaft (32), wherein the output shaft (32) has a longitudinal axis and is connected to the gear mechanism (18) for transmitting a torque to the at least one vehicle axle (17),
   a position sensing device (28, 30) for ascertaining a rotor position of the rotor,
   an electronic power unit (15, 16) that is connected to the electric motor (14) for supplying electrical energy to the electric motor, the electronic power unit (15) including an inverter (16); and
   an evaluating device (29) for evaluating signals of the position sensing device, the evaluating device being part of the electronic power unit,
   wherein the position sensing device is integrated in the electronic power unit,
   wherein the electronic power unit (15) is spaced from the electric motor (14) along the longitudinal axis, and
   wherein the gear mechanism (18) is between the electronic power unit (15) and the electric motor (14) along the longitudinal axis.

2. The vehicle axle mechanism according to claim 1, wherein the position sensing device comprises at least one position sensor (30, 33) for ascertaining the rotor position, wherein the at least one position sensor is fastened to at least one of a circuit board (34, 37) of the electronic power unit (15) and the evaluating device (29), and an element (31) that is to be detected by means of the at least one position sensor (30, 33) is arranged on a rotating component (32, 36) of one of the electric motor (14) and the gear mechanism (18).

3. The vehicle axle mechanism according to claim 2, wherein the rotating component is the output shaft (32) or a toothed wheel (36).

4. The vehicle axle mechanism according to claim 2, wherein the element (31) to be detected is at least one of a code disc, a disc that is marked in increments, a magnetic disc, a magnetic element and a toothed wheel flank of a toothed wheel (36) of the gear mechanism (18).

5. The vehicle axle mechanism according to claim 1, wherein the electric motor (14) is connected without the use of cables to the electronic power unit (15) and wherein the electric motor (14) and the electronic power unit (15) are electrically connected to one another by means of at least one stamped grid (35).

6. The vehicle axle mechanism according to claim 1, wherein winding wires (38) of the electric motor (14) are connected to the electronic power unit (15).

7. The vehicle axle mechanism according to claim 1, wherein the evaluating device (29) is arranged between the electric motor (14) and the electronic power unit (15).

8. The vehicle axle mechanism according to claim 1, wherein the gear mechanism (18) is arranged parallel to the electric motor (14).

9. The vehicle axle mechanism according to claim 1, wherein the electric motor (14), the gear mechanism (18), the electronic power unit (15) and the evaluating device (29) are juxtaposed.

10. The vehicle axle mechanism according to claim 1, wherein the electric motor (14), the gear mechanism (18), the electronic power unit (15) and the evaluating device (29) are juxtaposed and are arranged in a common casing (19).

11. The vehicle axle mechanism according to claim 9, wherein at least one of the electric motor (14), the gear mechanism (18), the electronic power unit (15) and the evaluating device (29) is cooled by means of a common cooling circuit (13).

12. The vehicle axle mechanism according to claim 9, wherein at least one of the electric motor (14), the gear mechanism (18), the electronic power unit (15) and the evaluating device (29) is cooled by means of a common cooling circuit (13), and wherein a cooling medium in the cooling circuit (13) is transmission oil for cooling and lubricating the gear mechanism (18).

13. The vehicle axle mechanism according to claim 1, wherein at least one additional electronic device is integrated into the electronic power unit (15) or into the evaluating device (29).

14. The vehicle axle mechanism according to claim 1, wherein at least one additional electronic device is integrated into the electronic power unit (15) or into the evaluating device (29) and the at least one additional electronic device is fastened to a circuit board (34, 37) of the electronic power unit (15) or of the evaluating device (29).

15. The vehicle axle mechanism according to claim 14, wherein the at least one additional electronic device is one of the following:

a power module,
a driver component,
a filter,
an actuator, wherein the actuator is preferably an actuator for a cooling medium pump (22) for the purpose of pumping cooling medium through the cooling circuit (13),
an actuator for actuating at least one valve,
an actuator for actuating a blower (27), and
a switching actuator.

16. A vehicle having at least one electric vehicle axle mechanism (12) according to claim 1, wherein the vehicle (1) is one of an electric vehicle, a fuel cell vehicle and a hybrid vehicle.

17. The vehicle axle mechanism according to claim 3, wherein the rotating component is the toothed wheel (36), and wherein the toothed wheel (36) is a gear in the gear mechanism (18).

18. The vehicle axle mechanism according to claim 3, wherein the rotating component is the output shaft (32).

19. The vehicle axle mechanism according to claim 18, wherein the element (31) that is to be detected is at an end of the output shaft (32), wherein the electronic power unit (15) is adjacent the end of the output shaft (32), and wherein the output shaft (32) extends through the gear mechanism (18).

20. The vehicle axle mechanism according to claim 1, wherein the electronic power unit (15) is adjacent an end of the output shaft (32), and wherein the output shaft (32) extends through the gear mechanism (18).

* * * * *